United States Patent [19]

Arff et al.

[11] 3,967,378

[45] July 6, 1976

[54] SAW CHAIN GUIDING ARRANGEMENT

[75] Inventors: Uwe F. Arff; Ronald J. Hatton, both of Peterborough, Canada

[73] Assignee: Outboard Marine Corporation, Waukegan, Ill.

[22] Filed: Nov. 25, 1974

[21] Appl. No.: 526,704

[52] U.S. Cl. .............................................. 30/383
[51] Int. Cl.$^2$ .................... B25B 17/02; B23D 57/02
[58] Field of Search .............. 30/373, 374, 381–387; 83/820

[56] References Cited

UNITED STATES PATENTS

| | | | |
|---|---|---|---|
| 2,921,613 | 1/1960 | Silvey | 30/387 |
| 3,327,741 | 6/1967 | Merz | 30/386 |
| 3,636,995 | 1/1972 | Newman | 30/386 |
| 3,870,125 | 3/1975 | Gorski | 30/383 |

*Primary Examiner*—James L. Jones, Jr.
*Attorney, Agent, or Firm*—Michael, Best & Friedrich

[57] ABSTRACT

Disclosed herein is a chain saw comprising a chain sprocket rotatably supported by a frame and driven by an engine supported by the frame, a sprocket guard supported from the frame, a cutter bar having an end supported between the frame and the sprocket guard in spaced relation from the sprocket, together with a first guide plate supported between the frame and the cutter bar and including a main part, and a guide portion extending from the main part and including a first part extending in generally parallel and laterally outwardly offset relation with respect to the cutter bar and a second part diverging laterally outwardly from the first part, and a second guide plate supported between the sprocket guard and the cutter bar and including a main part, and a guide portion extending from the second guide plate main part and including a first part extending in generally parallel and laterally outwardly offset relation with respect to the cutter bar, and a second part diverging laterally outwardly from the first part of the guide portion of the second guide plate, and a chain trained around the sprocket and extending between the guide portions and around the cutter bar.

16 Claims, 8 Drawing Figures

Fig. 1
PRIOR ART
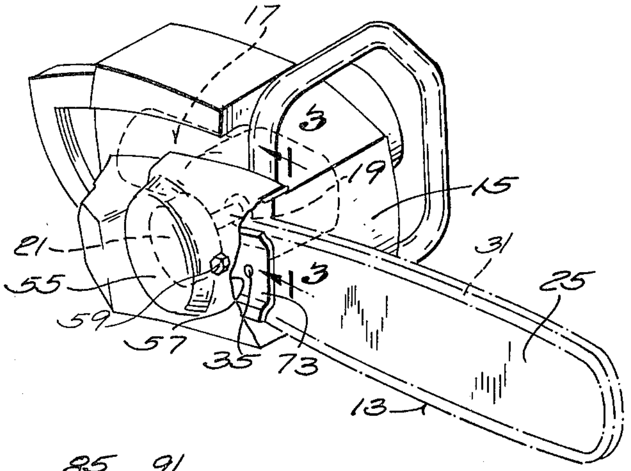
Fig. 2
PRIOR ART
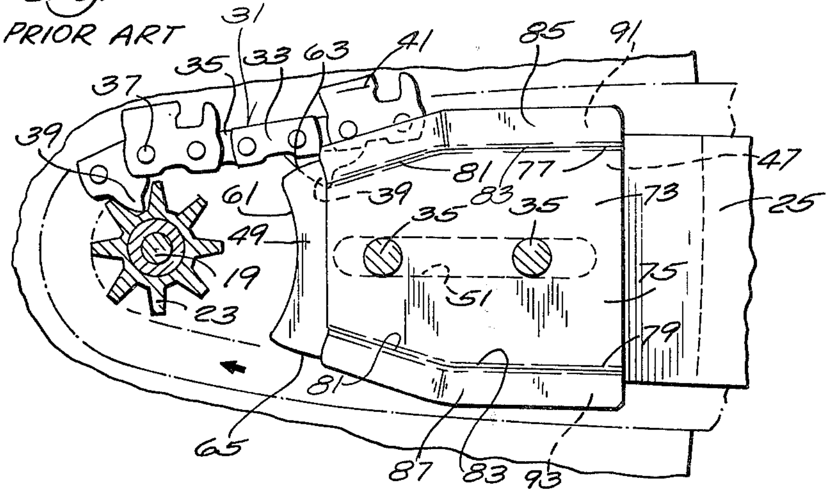
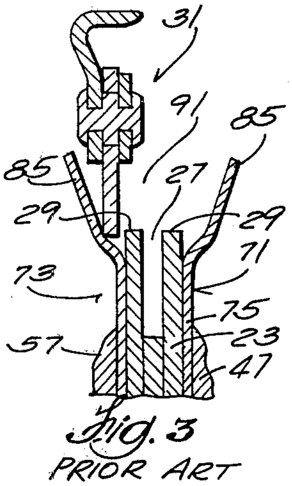
Fig. 3
PRIOR ART
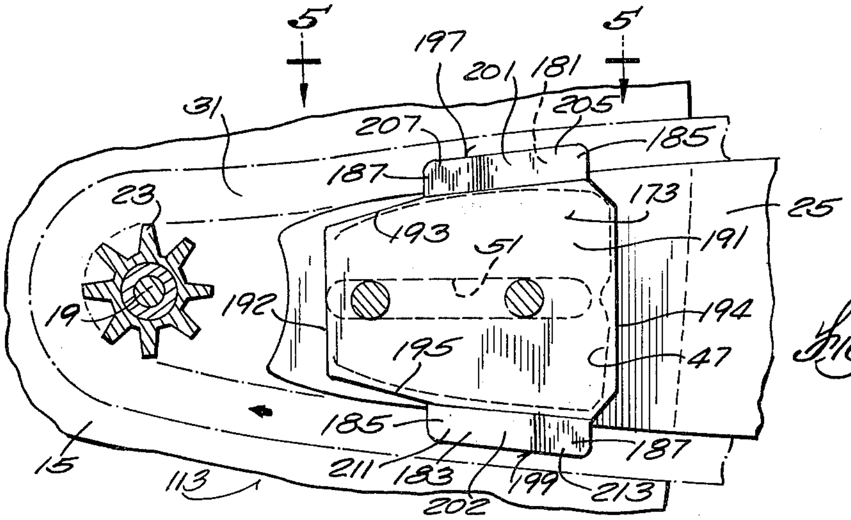
Fig. 4
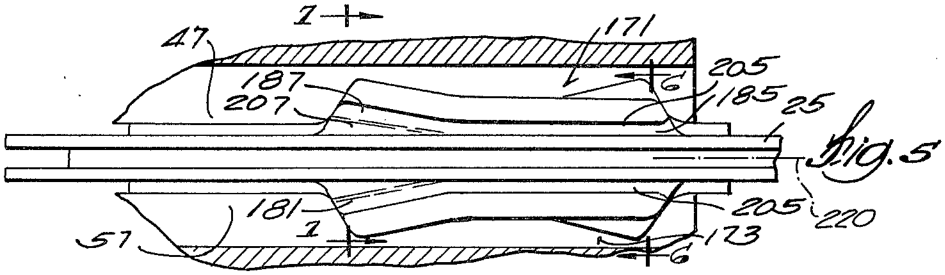
Fig. 5

SAW CHAIN GUIDING ARRANGEMENT

BACKGROUND OF THE INVENTION

The invention relates generally to chain saws and, more particularly, to arrangements for guiding a saw chain between the sprocket and the cutter bar.

More particularly, there is shown in FIGS. 1 through 3, a prior chain saw 13 which includes a supporting frame 15, an engine 17 supported by the frame 15, and a drive shaft 19 rotatably carried by the frame 15 and driven by the engine 17. The drive shaft 19 carries a centrifugal clutch 21 which, in response to drive shaft rotation, drivingly couples the drive shaft 19 to a chain sprocket 23 rotatably supported by the drive shaft 19.

Also supported by the frame 15 is a cutter bar 25 having (See FIG. 3) a peripheral groove 27 bordered by a pair of spaced margins 29. Trained around the sprocket 23 and extending in the cutter bar groove 27 is a saw chain 31 which typically includes in series, a pair of side links 33 pivotally connected to one end of a center link 35 located therebetween by a rivet 37. In turn, the other end of the center link 35 extends between another pair of side links 33 and is pivotally connected thereto by another rivet 37. The last mentioned pair of side links 33, are, in turn, pivotally connected by another rivet 37 to another center link 35 which, in turn, is pivotally connected by another rivet 37 to still another pair of side links 33 and so on. The center links 35 include depending drive tangs 39 which are engaged by the sprocket 23 to drive the chain 31 and which extend into the cutter bar groove 27 to guide the chain 31 during travel around the periphery of the cutter bar 25. The side links 33 ride on the margins 29 of the cutter bar groove 27 and every other pair of side links 33 includes a cutting tooth 41.

The cutter bar 25 is clamped to the frame 15 by means including two mounting posts 35 which extend fixedly from a frame portion 47 laterally adjacent to one end 49 of the cutter bar 25, which extend through a lengthwise slot 51 in the cutter bar end 49 so as to permit lengthwise movement of the cutter bar 25 relative to the chain sprocket 23 so as thereby to adjust chain tension, and which extend through apertures in a sprocket or chain guard or member 55. In this regard, the sprocket guard 55 extends generally in covering relation to the chain sprocket 23 and centrifugal clutch 21 and includes a clamping portion 57 which includes the apertures and which extends in laterally adjacent relation to the cutter bar end 49. Application of nuts 59 to the posts 35 serves to clamp the sprocket or chain guard 35 to the supporting frame 15 with the cutter bar 25 therebetween.

When assembled to the frame 15, the cutter bar end 49 is spaced somewhat from the sprocket 23 and includes a concavely arcuate edge 61 from which upper and lower end margin portions 63 and 65 respectively, extend in diverging relation in the direction away from the edge 61. The chain 31 extends generally tangentially (with some sag) from the top and bottom of the sprocket 23 to points of engagement of the side links 33 with the margins 29 of the cutter bar 25. The end portions 63 and 65 of the cutter bar margins converge in the direction toward the sprocket 23 from such points of chain engagement at a rate greater than the chain 31. Thus, the center link drive tangs 39 gradually enter and leave the peripheral cutter bar groove 27 and the side links 33 gradually approach and depart from the cutter bar margins 29.

In order to assist entry of the chain 31 onto the cutter bar 25 from the sprocket 23 and departure of the chain 31 from the cutter bar 25 and entry onto the sprocket 23, inner and outer guide plates 71 and 73 respectively are fixedly located between the cutter bar 25 and each of the frame portion 47 and the clamping portion 57 of the sprocket guard 55. Specifically, the inner guide plate 71 is located between the cutter bar 25 and the frame portion 47 and the outer guide plate 73 is located between the cutter bar 25 and the clamping portion 57 of the sprocket guard 55. In the past, as shown best in FIG. 2, each of the guide plates 71 and 73 included a central, generally flat, main part 75 having upper and lower edges 77 and 79, respectively, which diverged outwardly in the direction away from the chain sprocket 23. More specifically, the upper and lower edges 77 and 79 each included a portion 81 adjacent to the converging guide plate end and a portion 83 which diverges less rapidly as compared to the portion 81 and which is located at the divergent guide plate end.

In addition, each of the guide plates 71 and 73 included, along the upper and lower edges 77 and 79 of the main part 75 thereof, respective upper and lower outwardly divergent wing portions 85 and 87 which, together, formed fixedly located, upper and lower V-shaped guide ways 91 and 93 extending along the upper and lower edges 77 and 79 of the main part 75 in adjacently spaced relation from the sprocket 23 to the cutter bar margins 29, notwithstanding adjustment of the cutter bar 25 relative to the sprocket 23 as mentioned above.

SUMMARY OF THE INVENTION

The invention provides a chain saw comprising a chain sprocket rotatably supported by a frame and driven by an engine supported by the frame, a cutter bar having an end supported between the frame and a sprocket guard in spaced relation from the sprocket, a first guide plate supported between the frame and the cutter bar and including a main part, and a guide portion extending from the main part and including a first part extending in generally parallel and laterally outwardly offset relation with respect to the cutter bar and a second part diverging laterally outwardly from the first part, and a second guide plate supported between the sprocket guard and the cutter bar and including a main part, and a guide portion extending from the second guide plate main part and including a first part extending in generally parallel and laterally outwardly offset relation with respect to the cutter bar, and a second part diverging laterally outwardly from the first part of the guide portion of the second guide plate, and a chain trained around the sprocket and extending between the guide portions and around the cutter bar.

In accordance with one embodiment of the invention, the main part of the first guide plate includes upper and lower margins which diverge in the direction from the sprocket toward the cutter bar, and the first guide plate includes an upper wing formation having a guide portion extending upwardly from the main part upper margin and including a first part remotely spaced from the sprocket and extending in generally parallel and laterally outwardly offset relation with respect to the cutter bar, and a second part less remotely spaced from the sprocket than the first part and diverging laterally outwardly from the first part in the direction toward the sprocket.

Still further in addition, the first guide plate also includes a lower wing formation including a guide portion extending downwardly from the main part lower margin and including a first part spaced from the sprocket and extending in generally parallel and laterally outwardly offset relation with respect to the cutter bar, and a second part more remotely spaced from the sprocket than the first part and diverging laterally outwardly in the direction away from the sprocket.

In addition, the main part of the second guide plate includes upper and lower margins which diverge in the direction from the sprocket toward the cutter bar and the second guide plate includes an upper wing formation extending in spaced relation from the upper wing formation of the first guide plate and having a guide portion extending from the second guide plate main part upper margin and including a first part remotely spaced from the sprocket and extending in generally parallel and laterally outwardly offset relation with respect to the cutter bar, and a second part less remotely spaced from the sprocket than the first part of the guide portion of the upper wing formation of the second guide plate and diverging laterally outwardly from the first part of the guide portion of the upper wing formation of the second guide plate in the direction toward the sprocket.

The second guide plate also includes a lower wing formation extending in spaced relation from the lower wing formation of the first guide plate and having a guide portion extending downwardly from lower margin of the main part of the second guide plate and including a first part spaced from the sprocket and extending in generally parallel and laterally outwardly offset relation with respect to the cutter bar, and a second part more remotely spaced from the sprocket than the first part of the guide portion of the lower wing formation of the second guide plate and diverging laterally outwardly from the first part of the guide portion of the lower wing formation of the second guide plate in the direction away from the sprocket.

Also in accordance with an embodiment of the invention, the upper and lower guide portions include respective upper and lower edges, and the upper and lower wing formation includes respective upper and lower flange portions extending laterally outwardly with respect to the cutter bar from the respective upper and lower edges of the guide portions.

In a preferred embodiment in accordance with the invention, the saw chain includes a center link with a drive tang and the first parts of the guide portions are laterally offset from the main parts at a distance less than the thickness of the drive tang.

Also in a preferred embodiment in accordance with the invention, the first parts of the guide portions are laterally offset from the center plane of the cutter bar by a distance greater than one half the distance between the outer ends of the rivets connecting the saw chain links.

The invention also provides a chain saw comprising a frame supporting a sprocket for rotation, and supporting a cutter bar in spaced relation to the sprocket, and including a raised central land engaging the cutter bar and having a margin which extends in the direction between the sprocket and the cutter bar, and a guideway land extending along the margin in recessed relation to the central land and including a first part extending in generally parallel and laterally outwardly offset relation with respect to the cutter bar, and a second part diverging laterally outwardly from the first part, a sprocket guard supported by the frame and including a raised central land engaging the cutter bar and having a margin extending in the direction between the sprocket and the cutter bar, and a guideway land extending along the margin of the central land of the sprocket guard and including a first part extending in generally parallel and laterally outwardly offset relation with respect to the cutter bar and a second part diverging laterally outwardly from the first part of the guideway land of the sprocket guard, an engine supported by the frame and rotatably driving the sprocket, and a chain trained around the sprocket and extending between the guideway lands and around the cutter bar.

In accordance with one embodiment of the invention, the raised central land of the frame includes upper and lower margins which diverge in the direction from the sprocket toward the cutter bar, and the frame includes an upper guideway land extending along the upper margin in recessed relation to the central land and including a first part remotely spaced from the sprocket and extending in generally parallel and laterally outwardly offset relation with respect to the cutter bar, and a second part less remotely spaced from the sprocket and diverging laterally outwardly from the first part in the direction toward the sprocket. In addition, the frame includes a lower guideway land extending along the lower margin in recessed relation to the central land and including a first part spaced from the sprocket and extending in generally parallel and laterally outwardly offset relation with respect to the cutter bar, and a second part more remotely spaced from the sprocket than the first part and diverging laterally outwardly from the first part in the direction away from the sprocket.

Still further in addition, the raised central land of the sprocket guard includes upper and lower margins which diverge in the direction from the sprocket toward the cutter bar. In addition, the sprocket guard includes an upper guideway land extending along the upper margin of the central land of the sprocket guard and including a first part remotely spaced from the sprocket and extending in generally parallel and laterally outwardly offset relation with respect to the cutter bar and a second part less remotely spaced from the sprocket than the first part of the upper guideway land of the sprocket guard and diverging laterally outwardly from the first part of the upper guideway land of the sprocket guard in the direction toward the sprocket. In addition, the sprocket guard also includes a lower guideway land extending along the lower margin of the central land of the sprocket guard in recessed relation thereto and including a first part spaced from the sprocket and extending in generally parallel and laterally outwardly offset relation with respect to the cutter bar, and a second part more remotely spaced from the sprocket than the first part of the lower guideway land of the sprocket guard and diverging laterally outwardly from the first part of said lower guideway land of the sprocket guard in the direction away from the sprocket.

In a preferred embodiment in accordance with the invention, the saw chain includes a center link with a drive tang and the first parts of the guideway lands are recessed from the central lands at a distance less than the thickness of the drive tang.

Also in a preferred embodiment in accordance with the invention, the first parts of the guideway lands are spaced from the center plane of the cutter bar by a distance greater than one half the distance between the outer ends of the rivets connecting the lower chain links.

The invention further provides a guide plate for a chain saw, which guide plate includes a main part having an outer margin and a wing formation having a guide portion extending from the main part margin and including a first part extending in generally parallel and laterally outwardly offset relation from the main part and a second part diverging laterally outwardly from the first part.

In a preferred embodiment in accordance with the invention, the guide portion includes an outer edge and the wing formation also includes a flange portion extending laterally outward from the outer edge of the guide portion.

Also in a preferred embodiment in accordance with the invention, the main part of the guide plate has upper and lower divergent margins, the guide portion of the wing formation extends from the main part upper margin, and the guide plate further includes a lower wing formation including a guide portion extending from the lower margin of the main part and including a first part extending in generally parallel and laterally outwardly offset relation from the main part and a second part diverging outwarding from the first part of the guide portion of the lower wing formation in the direction opposite from the second part of the guide portion of the wing formation extending from the upper margin of the main part. Still further, in a preferred embodiment in accordance with the invention, the guide portions have outer edges and the wing formations include respective flange portions extending laterally outwardly from the outer edges.

One of the principal features of the invention is the provision of a chain saw including improved means for guiding chain travel between the cutter bar and sprocket.

Another of the principal features of the invention is the provision of a chain saw including improved guide plates for guiding saw chain travel between the cutter bar and the sprocket.

Still another of the principal features of the invention is the provision of a chain saw including one or more chain guideways which are located between the sprocket and cutter bar and which include a chain entering section including walls which converge in the direction of chain travel and a section from which the chain departs and which includes parallel walls. The parallel walls merge with the walls of the entering section and, preferably, are offset from the adjacent cutter bar sides by a distance less than the thickness of a center link tang and are spaced apart from each other at a distance greater than the distance between the outer ends of the rivets which pivotally connect the chain links.

Other features and advantages of the invention will become known by reference to the following drawings, general description and claims.

THE DRAWINGS

FIG. 1 is a perspective view of a prior art chain saw.

FIG. 2 is a fragmentary side view, with parts omitted and parts in section, of a portion of the prior art chain saw shown in FIG. 1.

FIG. 3 is an enlarged sectional view taken generally along line 3—3 of the prior art chain saw shown in FIG. 1.

FIG. 4 is a fragmentary side view which is similar to FIG. 2, and which illustrates a chain saw embodying various of the features of the invention.

FIG. 5 is a fragmentary view, with parts omitted, taken generally along line 5—5 of FIG. 4.

Figure 6:
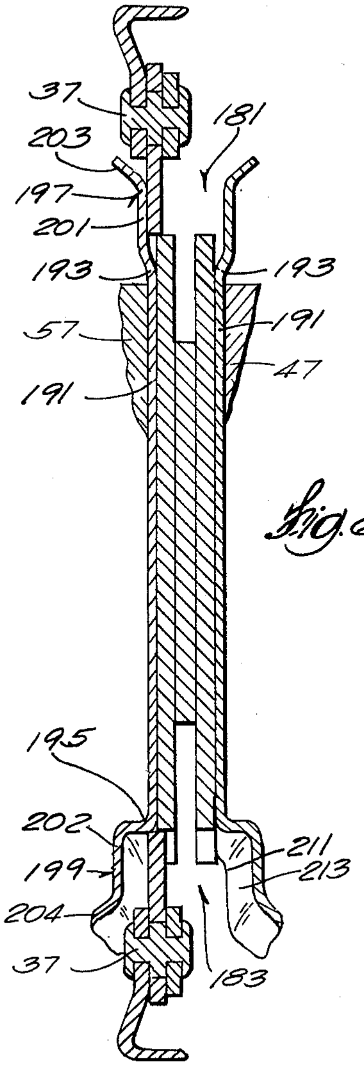
FIG. 6 is an enlarged fragmentary sectional view, taken generally along line 6—6 of FIG. 5.
Figure 7:
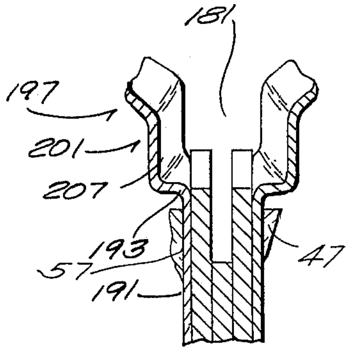
FIG. 7 is an enlarged fragmentary sectional view taken generally along line 7—7 of FIG. 5.

Before explaining the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein is for the purposes of description and should not be regarded as limiting.

GENERAL DESCRIPTION

The invention, as illustrated in FIGS. 4 through 7 is applicable to chain saws such as the prior chain saw 13 shown in FIGS. 1 through 3 and involves, in one embodiment, omission of the guide plates 71 and 73 and substitution of modified inner and outer guide plates 171 and 173 respectively. More particularly, there is shown in FIGS. 4 through 7 a fragmentarily illustrated chain saw 113 which embodies various of the features of the invention and which, except for the guide plates 71 and 73, is otherwise of the same construction as the chain saw 13. Accordingly, a further description is not believed necessary except to note that where applicable, the same reference characters have been employed with respect to the components of saw chain 113 and have been previously applied to the components of the prior chain saw 13.

In accordance with the invention, the guide plates 173 and 175 are formed to provide, in combination, upper and lower chain guideways 181 and 183 respectively, each of which includes a chain departing portion or section 185 which guides chain departure and which has generally parallel sidewalls spaced apart at a distance slightly greater than the axial length of the saw chain rivets 37 and a divergent or chain entering portion or section 187 which guides the chain into the portion 185. As the chain travels in the clockwise direction as seen in FIG. 4, in the upper guideway 181, the chain departing portion 183 is located remotely from the sprocket 23 and the chain entering portion 187 is located less remotely from the sprocket 23. In the lower guideway 183, the chain entering portion 187 is located remotely from the sprocket 23 and the chain departing portion 183 is located less remotely from the sprocket 23.

More particularly, as shown in FIG. 4, the outer guide plate 173, located between the cutter bar 25 and the clamping portion 57 of the sprocket guard 55 includes a main body 191 having a convergent end 192 and a divergent end 194, together with upper and lower margins 193 and 195, respectively, which diverge in the direction away from the sprocket 23. In addition, the outer guide plate 173 includes upper and lower wing formations 197 and 199, which respectively extend from the upper and lower margins 193 and 195 and which respectively include upper and lower guide portions 201 and 202, respectively, and upper and lower flange portions 203 and 204, respectively, extending laterally outwardly from the guide portions 201 and 202 in the direction away from the cutter bar 25.

The upper guide portion 201 included in the upper wing formation 197 includes (see FIGS. 4 and 5) a sidewall part 205 located adjacent the divergent end 194 of the outer guide plate 173, in generally parallel and laterally outwardly offset relation from the main body 191. The amount of offset is preferably less than the thickness of the center link drive tang 39 so as to prevent the tang 39 from being caught laterally outwardly of the sides of the cutter bar 25 as shown in FIG. 3.

The guide portion 201 of the upper wing formation 197 also includes a part 207 which diverges laterally outwardly with respect to the cutter bar 25 from the sidewall part 205 in the direction toward the convergent end 192 of the outer guide plate 173. A transition part joins a portion of the upper margin 193 with the bottom of the diverging part 207 of the guide portion 201 of the upper wing formation 197.

The guide portion 202 included in the lower wing formation 199 of the outer guide plate 175 includes a sidewall part 211 located adjacent the convergent end 192 of the outer guide plate 173, in generally parallel and laterally outwardly offset relation from the main body 191. The amount of offset is preferably less than the thickness of the center link drive tang 39 so as to prevent the center link tang 39 from being caught laterally outwardly of the sides of the cutter bar 25.

The guide portion 202 of the lower wing formation 199 also includes a part 213 which diverges laterally outwardly with respect to the cutter bar 25 from the sidewall part 211 in the direction toward the divergent end 194 of the outer guide plate 175. A transition part joins the lower margin 197 of the main body 191 with the bottom of the diverging part 213 of the guide portion 202 of the lower wing formation 199.

The inner guide plate 173, located between the cutter bar 25 and the frame portion 47 is constructed generally identically to the outer guide plate 175 except that the upper and lower wing formations 197 and 199 thereof extend laterally outwardly from the cutter bar 25 in the direction opposite from the outer guide plate 175, that is in the direction from the cutter bar 25 toward the supporting form 15.

Thus, when the inner and outer guide plates 173 and 175 are located on either side of the cutter bar 25, the laterally spaced sidewall parts 205 of the guide portions 201 of the upper wing formations 197 define the chain departing portion 185 of the upper guideway 181 and the laterally spaced, diverging parts 207 of the portions 201 of the upper wing formations 197 define the chain entering portion 185 of the upper guideway 181.

Similarly, the laterally spaced, parallel sidewall parts 211 of the guide portions 202 of the lower wing formations 199 define the chain departing portion 185 of the lower guideway 183 and the laterally spaced, diverging parts 213 of the guide portions 202 of the lower wing formations 199 define the chain entering portion 187 of the lower guideway 183. As already pointed out, in order to avoid catching the center link tang 39 on the outside surface of the cutter bar 25, as shown in FIG. 3, the laterally offset parallel sidewall parts 205 and 211 of the guide portions 201 and 202 are spaced from the main part 191 of the guide plates 171 and 173 at a distance less than the thickness of the center link tang 39. In addition, the spacing between the parallel parts 205 and 211 of the guide portions 201 and 202 is slightly greater than the distance of the outer ends of the rivets 37 which pivotally connect the chain links.

In other words, the parallel parts 205 and 211 of the guide plates are laterally offset from the center plane 220 (See FIG. 5) of the cutter bar 25 at a distance greater than one-half the distance between the outer ends of the rivets 37 connecting the saw chain.

Figure 8:
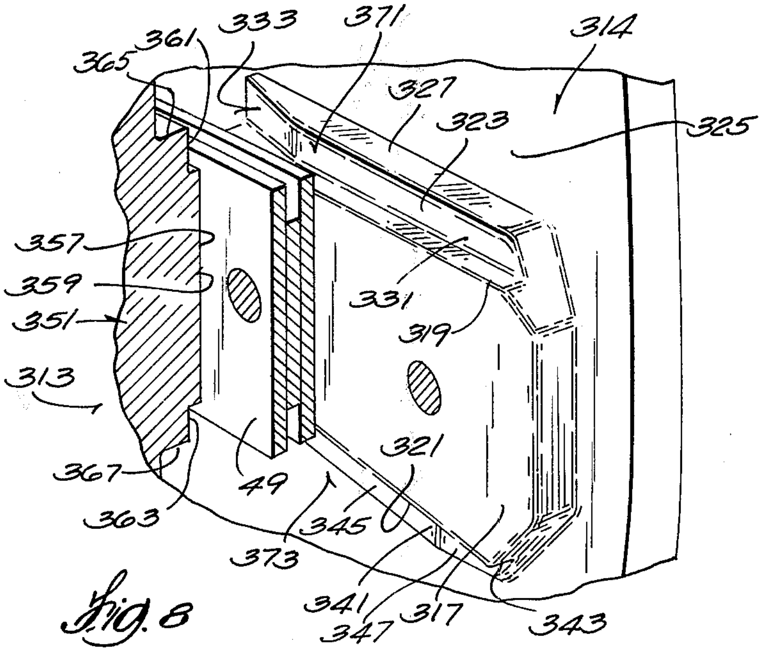
FIG. 8 is an enlarged fragmentary perspective view, with parts broken away and in section, of another embodiment of a chain saw incorporating various of the features of the invention.

In further accordance with the invention, the upper and lower guideways 181 and 183 can be formed by suitably constructing the portion 47 of the frame 15 and the clamping portion 57 of the sprocket guard 55 and by omitting the guide plates 173 and 175. Thus, there is fragmentarily shown in FIG. 8 a chain saw 313 including a supporting frame 314 having frame portion provided with a raised central land 317 which is adapted to engage the cutter bar end 49, which corresponds to the main body 191 of the inner guide plate 173, and which has upper and lower margins 319 and 321, respectively, which diverge in the direction away from the sprocket (not shown). Extending adjacent the upper margin 319 is an upper guideway land 323 which is recessed relative to the raised central land 317 but which, nevertheless, is raised with respect to the adjacent frame portion 325 and which corresponds generally to the upper guide portion 201 of the upper wing formation 197 of the inner guide plate 173. Extending between the upper guideway land 323 and the adjacent frame portion 325 is a wall 327 which corresponds generally to the flange portion 203 of the upper wing formation 197 of the inner guide plate 173.

The upper guideway land 323 includes a sidewall part 331 which is located remotely from the sprocket, which corresponds generally to the sidewall part 205 of the guide portion 201 of the upper wing formation 197 of the inner guide plate 173, and which extends in generally parallel relation to the raised central land 317 at a depth therefrom less than the thickness of the center link drive tang 39. The upper guideway land 323 also includes a part 333 which extends from the sidewall part 331, and which increases in depth from the raised central land 317 in the direction toward the sprocket, and which corresponds to the diverging part 207 of the guide portion 201 of the upper wing formation 197 of the inner guide plate 173.

Extending adjacent to the lower margin of the raised central land 317 is a lower guideway land 341 which is recessed relative to the raised central land 317 but which is, nevertheless, elevated with respect to the adjacent frame portion 325, and which corresponds generally to the guide portion 202 of the lower wing formation 199 of the inner guide plate 173. Extending between the lower guideway land 341 and the adjacent frame portion 325 is a wall 343 which corresponds generally to the flange portion 204 of the lower wing formation 199 of the inner guide plate 173.

The lower guideway land 341 includes a sidewall part 345 which is located remotely from the sprocket, which corresponds generally to the sidewall part 211 of the guide portion 202 of the lower wing formation 199 of the inner guide plate 173, and which is located at a depth below the raised central land 317 less than the thickness of the center link drive tangs 39. The lower guideway land 341 also includes a part 347 which extends from the sidewall part 345, which increases in depth from the raised central land 316 in the direction away from the sprocket, and which corresponds to the diverging part 213 of the guide portion 202 of the lower wing formation 199 of the inner guide plate 173.

The chain saw 313 also includes a chain or sprocket guard 351 having a portion constructed so as to present an inner surface 357 which is similar to the inner surface of the outer guide plate 175 and which includes a raised central land 359 engagable with the cutter bar end 49, together with upper and lower guideway lands 361 and 363, respectively, which are recessed below the raised central land 359, and upper and lower walls 365 and 367, which extend respectively from the upper and lower guideway lands 361 and 363 in the direction outwardly from the cutter bar 25. The upper and lower guideway lands 361 and 353 include sidewall parts and diverging parts as already explained.

Accordingly, when the cutter bar 25 is assembled between the frame 314 and the sprocket guard 351 and in engagement with the raised central lands 317 and 359, the spaced upper guideway lands 323 define an upper guideway 371 and the spaced lower guideway lands 341 define a lower guideway 373, which upper and lower guideways 371 and 373 are essentially similar in shape and construction to the guideways 181 and 183 which are provided by the inner and outer guide plates 173 and 175.

It is noted that the ends of the upper guideways 181 and 371 and of the lower guideways 183 and 373 remote from the sprocket 23 are located for transition to and from the upper and lower margins 29 of the cutter bar 25 along the cutter bar area which is generally flat. Thus, inward and outward movement of the cutter bar 25 relative to the chain sprocket 23 (and therefore relative to the guideways 181, 183, 371 and 373) has minimal effect on the transition from the guideways to and from the margins 29 of the cutter bar 25.

In operation in accordance with the invention, the chain 31 travels rearwardly along the lower margin of the cutter bar 25 to the diverging section or portion of the lower guideway 183 or 373 and then into the straight portion of the lower guideway from which the chain 31 travels onto the sprocket 23. Thus, any lateral movement which may occur incident to travel of the chain 31 from the cutter bar 25 and toward the sprocket 23 is confined and channeled so that the chain travels smoothly onto the sprocket 23. Similarly, as the chain 31 leaves the sprocket 23, it enters into the diverging section or portion of the upper guideway 181 or 371 and then into the straight section of the upper guideway from which the chain 31 travels onto the upper margin 29 of the cutter bar 25. Any lateral shaking of the chain 31 which could occur incident to departure from the sprocket 23 is controlled and reduced by the upper guideway 181 and 371 which provides for smooth transition of the chain from the sprocket 23 onto the cutter bar 25. It is particularly noted that the transition provided for by use of the upper and lower guideways 181, 183, 371 and 373 avoids the problem which is present in the prior art and which is illustrated in FIG. 3.

While some of the advantages of the invention are available by using either the upper guideway or the lower guideway, it is preferred that both upper and lower guideways be simultaneously employed.

Various of the features of the invention are set forth in the following claims.

We claim:

1. A chain saw comprising a frame, an engine supported by said frame, a chain sprocket rotatably supported by said frame and driven by said engine, a sprocket guard supported from said frame, a cutter bar having an end supported between said frame and said sprocket guard in spaced relation from said sprocket, a first guide plate supported between said frame and said cutter bar and including a main part, and a guide portion extending from said main part and including a first part extending in generally parallel and laterally outwardly offset relation with respect to said cutter bar and a second part diverging laterally outwardly from said first part, and a second guide plate supported between said sprocket guard and said cutter bar and including a main part, and a guide portion extending from said second guide plate main part and including a first part extending in generally parallel and laterally outwardly offset relation with respect to said cutter bar, and a second part diverging laterally outwardly from said first part of said guide portion of said second guide plate, and a chain trained around said sprocket and extending between said guide portions and around said cutter bar.

2. A chain saw in accordance with claim 1 wherein said saw chain includes a center link with a drive tang having thickness and wherein said first parts are laterally offset from said main parts at a distance less than said thickness.

3. A chain saw in accordance with claim 1 wherein said cutter bar includes a central plane, wherein said saw chain includes a series of pairs of side links connected to a series of center links by rivets having outer ends, wherein said center links each have a drive tang having thickness, and wherein said first parts are laterally offset from said main parts at a distance less than said thickness and are laterally offset from said center plane of said cutter bar by a distance greater than one-half the distance between said rivet outer ends.

4. A chain saw comprising a frame, an engine supported by said frame, a chain sprocket rotatably supported by said frame and driven by said engine, a sprocket guard supported from said frame, a cutter bar having an end supported between said frame and said sprocket guard in spaced relation from said sprocket, a first guide plate supported between said frame and said cutter bar end and including a main part having upper and lower margins which diverge in the direction from said sprocket toward said cutter bar, said first guide plate also including an upper wing formation having a guide portion extending upwardly from said main part upper margin, having an upper edge, and including a first part remotely spaced from said sprocket and extending in generally parallel and laterally outwardly offset relation with respect to said cutter bar, and a second part less remotely spaced from said sprocket than said first part and diverging laterally outwardly from said first part in the direction toward said sprocket, said upper wing formation also including a flange portion extending laterally outwardly with respect to said cutter bar from said upper edge of said guide portion, said first guide plate also including a lower wing formation including a guide portion extending downwardly from said main part lower margin, having a lower edge, and including a first part spaced from said sprocket and extending in generally parallel and laterally outwardly offset relation with respect to said cutter bar, and a second part more remotely spaced from said sprocket than said first part and diverging laterally outwardly from said first part of said lower wing formation guide portion in the direction away from said sprocket, said lower wing formation also including a flange portion extending laterally outwardly with respect to said cutter bar from said lower edge of said guide portion of said lower wing formation, and a second guide supported between said sprocket guard and said cutter bar and including a main part having upper and lower margins which diverge in the direction from said sprocket toward said cutter bar, said second guide plate including an upper wing formation extending in spaced relation from said upper wing formation of said first guide plate and having a guide portion extending from said second guide plate main part upper margin, having an upper edge, and including a first part remotely spaced from said sprocket and extending in generally parallel and laterally outwardly offset relation with respect to said cutter bar, and a second part less remotely spaced from said sprocket than said first part of said guide portion of said upper wing formation of said second guide plate and diverging laterally outwardly from said first part of said guide portion of said upper wing formation of said second guide plate in the direction toward said sprocket, said second guide plate upper wing formation also including a flange portion extending laterally outwardly with respect to said cutter bar from said upper edge of said guide portion of said upper wing formation of said second guide plate, said second guide plate also including a lower wing formation extending in spaced relation from said lower wing formation of said first guide plate and having a guide portion extending downwardly from said lower margin of said main part of said second guide plate, having a lower edge, and including a first part spaced from said sprocket and extending in generally parallel and laterally outwardly offset relation with respect to said cutter bar, and a second part more remotely spaced from said sprocket than said first part of said guide portion of said lower wing formation of said second guide plate and diverging laterally outwardly from said first part of said guide portion of said lower wing formation of said second guide plate in the direction away from said sprocket, said lower wing formation of said second guide plate also including a flange portion extending laterally outwardly with respect to said cutter bar from said lower edge of said guide portion of said lower wing formation of said second guide plate, and a chain trained around said sprocket and extending between said guide portions and around said cutter bar.

5. A chain saw in accordance with claim 4 wherein said saw chain includes a center link with a drive tang having thickness and wherein said first parts are laterally offset from said main parts at a distance less than said thickness.

6. A chain saw in accordance with claim 4 wherein said cutter bar includes a central plane, wherein said saw chain includes a series of pairs of side links connected to a series of center links by rivets having outer ends, wherein said center links each have a drive tang having thickness, and wherein said first parts are laterally offset from said main parts at a distance less than said thickness and are laterally offset from said center plane of said cutter bar by a distance greater than one-half the distance between said outer rivet ends.

7. A chain saw comprising a cutter bar, a chain sprocket, a frame supporting said sprocket for rotation, and supporting said cutter bar in spaced relation to said sprocket, and including a raised central land engaging said cutter bar and having a margin which extends in the direction between said sprocket and said cutter bar, and a guideway land extending along said margin in recessed relation to said central land and including a first part extending in generally parallel and laterally outwardly offset relation with respect to said cutter bar, and a second part diverging laterally outwardly from said first part, a sprocket guard supported by said frame and including a raised central land engaging said cutter bar and having a margin extending in the direction between said sprocket and said cutter bar, and a guideway land extending along said margin of said central land of said sprocket guard and including a first part extending in generally parallel and laterally outwardly offset relation with respect to said cutter bar and a second part diverging laterally outwardly from said first part of said guideway land of said sprocket guard, an engine supported by said frame and rotatably driving said sprocket, and a chain trained around said sprocket and extending between said guideway lands and around said cutter bar.

8. A chain saw in accordance with claim 7 wherein said saw chain includes a center link with a drive tang having thickness and wherein said first parts of said guideway lands are recessed from said central lands at a distance less than said thickness.

9. A chain saw in accordance with claim 7 wherein said cutter bar includes a central plane, wherein said saw chain includes a series of pairs of side links connected to a series of center links by rivets having outer ends, wherein said center links each have a drive tang having thickness, and wherein said first parts of said guideway lands are recessed from said central lands at a distance less than said thickness and are spaced from said center plane of said cutter bar by a distance greater than one-half the distance between said rivet outer ends.

10. A chain saw comprising a cutter bar, a chain sprocket, a frame supporting said sprocket for rotation, and supporting said cutter bar in spaced relation to said sprocket, and including a raised central land engaging said cutter bar and having upper and lower margins which diverge in the direction from said sprocket toward said cutter bar, an upper guideway land extending along said upper margin in recessed relation to said central land and including a first part remotely spaced from said sprocket and extending in generally parallel and laterally outwardly offset relation with respect to said cutter bar, and a second part less remotely spaced from said sprocket and diverging laterally outwardly from said first part in the direction toward said sprocket, and a lower guideway land extending along said lower margin in recessed relation to said central land and including a first part spaced from said sprocket and extending in generally parallel and laterally outwardly offset relation with respect to said cutter bar, and a second part more remotely spaced from said sprocket than said first part and diverging laterally outwardly from said first part in the direction away from said sprocket, a sprocket guard supported by said frame and including a raised central land engaging said cutter bar and having upper and lower margins which diverge in the direction from said sprocket toward said cutter bar, an upper guideway land extending along said upper margin of said central land of said sprocket guard and including a first part remotely spaced from said sprocket and extending in generally parallel and laterally outwardly offset relation with respect to said cutter bar and a second part less remotely spaced from said sprocket than said first part of said upper guideway land of said sprocket guard and diverging laterally outwardly from said first part of said upper guideway land of said sprocket guard in the direction toward said sprocket, and a lower guideway land extending along said lower margin of said central land of said sprocket guard in recessed relation thereto and including a first part spaced from said sprocket and extending in generally parallel and laterally outwardly offset relation with respect to said cutter bar, and a second part more remotely spaced from said sprocket than said first part of said lower guideway land of said sprocket guard and diverging laterally outwardly from said first part of said lower guideway land of said sprocket guard in the direction away from said sprocket, an engine supported by said frame and rotatably driving said sprocket, and a chain trained around said sprocket and extending between said guideway lands and around said cutter bar.

11. A chain saw in accordance with claim 10 wherein said saw chain includes a center link with a drive tang having thickness and wherein said first parts of said guideway lands are recessed from said central lands at a distance less than said thickness.

12. A chain saw in accordance with claim 10 wherein said cutter bar includes a central plane, wherein said saw chain includes a series of pairs of side links connected to a series of center links by rivets having outer ends, wherein said center links each have a drive tang having thickness, and wherein said first parts of said guideway lands are recessed from said central lands at a distance less than said thickness and are spaced from said center plane of said cutter bar by a distance greater than one-half the distance between said rivet outer ends.

13. A guide plate for a chain saw, said guide plate including a main part having an outer margin and a wing formation having a guide portion extending from said main part margin and including a first part extending in generally parallel and laterally outwardly offset relation from said main part and a second part diverging laterally outwardly from said first part.

14. A guide plate in accordance with claim 13 wherein said guide portion includes an outer edge and wherein said wing formation also includes a flange portion extending laterally outwardly from said outer edge of said guide portion.

15. A guide plate in accordance with claim 13 wherein said main part has upper and lower divergent margins, wherein said guide portion of said wing formation extends from said main part upper margin, and wherein said guide plate further includes a lower wing formation including a guide portion extending from said lower margin of said main part and including a first part extending in generally parallel and laterally outwardly offset relation from said main part and a second part diverging outwardly from said first part of said guide portion of said lower wing formation in the direction opposite from said second part of said guide portion of said wing formation extending from said upper margin of said main part.

16. A guide plate in accordance with claim 15 wherein said guide portion of said wing formation extending from said upper margin has an upper edge, and wherein said wing formation extending from said upper margin also includes a flange portion extending laterally outwardly from said upper edge, and wherein said guide portion of said lower wing formation has a lower edge, and wherein said lower wing formation also includes a flange portion extending laterally outwardly from said lower edge of said guide portion of said lower wing formation.

* * * * *

PO-1050
(5/69)

UNITED STATES PATENT OFFICE
CERTIFICATE OF CORRECTION

Patent No. 3,967,378 Dated July 6, 1976

Inventor(s) Uwe F. Arff and Ronald J. Hatton

It is certified that error appears in the above-identified patent and that said Letters Patent are hereby corrected as shown below:

| | |
|---|---|
| Column 6, line 42 | delete "and", insert ---as---. |
| Column 11, line 10 | after "guide", insert ---plate---. |

Signed and Sealed this

Twenty-second Day of February 1977

[SEAL]

*Attest:*

RUTH C. MASON
*Attesting Officer*

C. MARSHALL DANN
*Commissioner of Patents and Trademarks*